United States Patent [19]

Katayama

[11] Patent Number: 4,550,506
[45] Date of Patent: Nov. 5, 1985

[54] MEASURING MACHINE

[76] Inventor: Takao Katayama, No. 21-2, 2-chome, Chuo, Ohta-ku, Tokyo, Japan

[21] Appl. No.: 521,359

[22] Filed: Aug. 8, 1983

[30] Foreign Application Priority Data

Sep. 14, 1982 [JP] Japan .................................. 57-15880

[51] Int. Cl.[4] .............................................. G01B 7/02
[52] U.S. Cl. ................................ 33/143 L; 33/147 E; 33/147 F
[58] Field of Search ............. 33/143 R, 143 F, 143 L, 33/147 R, 147 E, 147 F, 147 N

[56] References Cited

U.S. PATENT DOCUMENTS

| | | | |
|---|---|---|---|
| 1,531,357 | 3/1925 | Tautz | 33/147 F |
| 2,594,077 | 4/1952 | Schulze | 33/147 R |
| 3,987,552 | 10/1976 | Raiteri | 33/147 N |
| 4,008,523 | 2/1977 | von Voros | 33/147 F |
| 4,208,796 | 6/1980 | Michaud et al. | 33/147 E |
| 4,389,783 | 6/1983 | Sakata et al. | 33/143 L |

FOREIGN PATENT DOCUMENTS 56-41846 9/1981 Japan .
1353441 5/1974 United Kingdom ............. 33/143 R Primary Examiner—Richard R. Stearns
Attorney, Agent, or Firm—Wenderoth, Lind & Ponack

[57] ABSTRACT

The invention provides a measuring machine which includes a stationary measuring contact point and a movable measuring contact point, each of which is positioned so as to oppose each other. Measuring of an object is carried out by putting the object between the stationary measuring contact point and the movable measuring contact point. A spindle carrying the movable measuring contact point is supported by a linear bearing of the crossed roller type. The linear bearing supports the spindle in plural directions. Thus, the sliding motion of the spindle can be carried out smoothly to obtain the precise measuring value.

1 Claim, 5 Drawing Figures

MEASURING MACHINE

BACKGROUND OF THE INVENTION a. Field of the Invention

The present invention relates to a measuring apparatus, and more particularly to a measuring machine for measuring length, thickness, width or the like of an object to be measured.

b. Description of the Prior Art

In a conventional measuring machine for use with a measuring device, such as a micrometer, a dial guage or the like is employed to measure precisely an object having a relatively large dimension. Thus, the measuring machine is, generally, provided with a stationary measuring contact point and a movable measuring contact point positioned so as to oppose the stationary contact point. A sliding member is in the form of a spindle carrying the movable contact point and a guiding member guides the spindle to make the movable measuring contact point approach or back away.

In the conventional measuring machine of the dial-guage type, the sliding member is conveyed toward the stationary measuring contact point in order to measure the dimensions of the object. The sliding member is conveyed along with the guiding member. The guiding member is, generally, provided with rollers, each of which is positioned at both end portions of the guiding member.

In the conventional measuring machine, a clearance is provided between the sliding member and a bearing unit with the aim of permitting a sliding motion of the sliding member. By the presence of clearance, the sliding member is inevitably slid and thereby the uniform and precise measuring value can not be obtained. By the swinging motion of the sliding member in the form of the spindle, sliding friction acts on the spindle to decrease the smooth forward and backward movements of the spindle and, therefore, a large amount of actuating force is necessary because of the sliding friction acting on the spindle.

SUMMARY OF THE INVENTION

It is, accordingly, an object of the present invention to provide an improved measuring machine which can measure precisely a relatively large object.

It is a further object of the invention to provide a measuring machine in which forward and backward motions of a spindle, which carries a movable contact point, can be smoothly performed and thereby measuring precision can be enhanced as well as the endurance increased.

According to the present invention, there is provided a measuring machine which comprises a housing including a base, means for measuring a dimension of an object, a stationary measuring contact point secured to the base, a movable measuring contact point, a sliding member carrying the movable measuring contact point means for scaling the dimension of the object corresponding to a measured value of the measuring means, means for guiding a measuring motion of the sliding member of the measuring means, and means for actuating the sliding member in the measuring of said object, said guiding means comprises a pair of bearing units having a plurality of linear bearing means for slidably supporting the sliding member in a plurality of directions.

According to the present invention, the above described disadvantages in the prior art are avoided completely by using a linear bearing of the crossed roller type as the supporting means for supporting a spindle. Namely, according to the measuring machine of the present invention, since the spindle is protected completely against the upper and lower directional forces and the rotating force, the vibrating motion of the spindle is eliminated to obtain the rectlinear propagating motion of the spindle. Therefore, high measuring precision can be obtained.

Further, the friction resistance acting on the spindle is small and, thus, a small operating force is required, since the motion of the spindle is smoothly carried out under the rolling friction, not withstanding the magnitude of the scale pressure. It was impossible to measure a dimension of an object in the prior art measuring machine under the scale pressure of, for example, less than 100 grams. According to the measuring machine of the present invention, it is possible to measure a dimension under the scale pressure of about 10 grams.

DESCRIPTION OF THE PREFERRED EMBODIMENT

Figure 1:
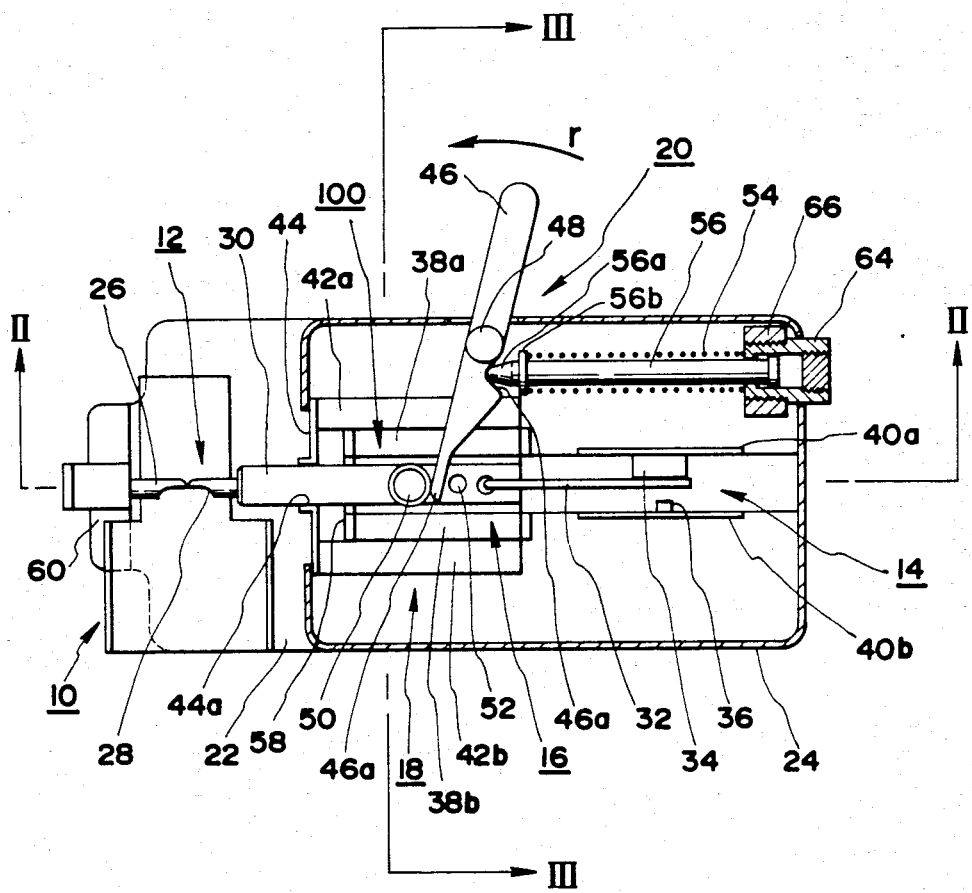
FIG. 1 is a plan view of a measuring machine of the present invention.

Referring to FIG. 1 of the drawings in greater detail, there is shown a measuring machine which comprises a housing 10, a measuring member 12 for measuring a dimension of an object to be measured, a scaling member 14 for scaling the dimension of the object to be measured, a guiding member 16 for guiding a measuring motion of the measuring member 12, a supporting member 18 for supporting the measuring member 12 on the housing 10, and an actuating member 20 for actuating the measuring member 12 to measure the object.

As is shown in FIG. 1, the housing 10 is provided with a base 22 and a casing 24 mounted on the base 22. The measuring member 12 comprises a stationary measuring contact point 26, a movable measuring contact point 28, a sliding member in the form of a spindle 30 carrying the movable contact point 26 and a scale in the form of a glass scale plate 32 which is fastened to the spindle 30. The scaling member 14 comprises a read sensor 34 and a light source 36. The guiding member 16 comprises a pair of bearing units 100 (100a and 100b in FIG. 4), and a pair of guiding bars 38a and 38b. The supporting member 18 comprises supporting plates 42a and 42b and a disc-plate 44 having an aperture 44a. The actuating member 20 comprises an actuating lever 46 of which a center portion is pivotably mounted on the casing 24 by a pin 48. An actuating rod 56 also engages with the actuating lever 46.

Figure 2:
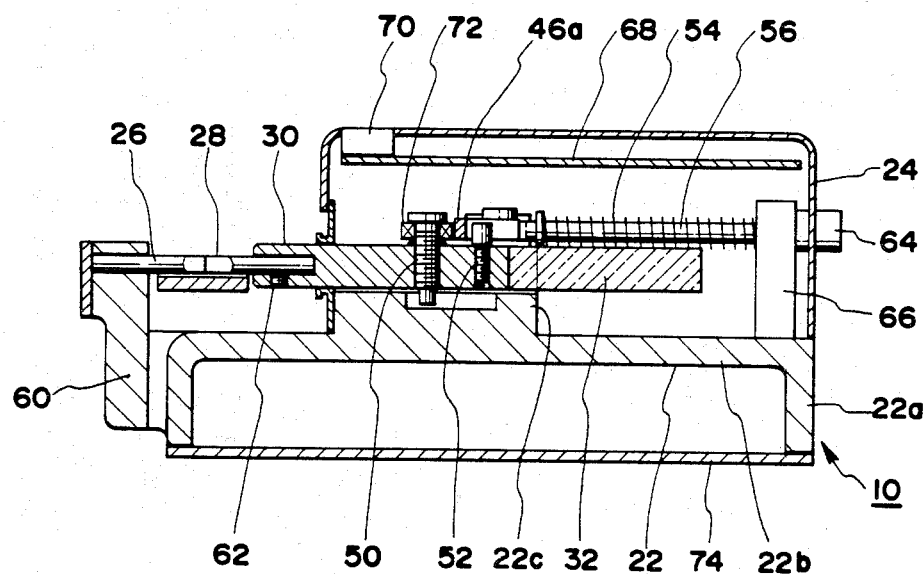
FIG. 2 is a vertical sectional view of the measuring machine of the present invention taken along line II—II of FIG. 1.
Figure 3:
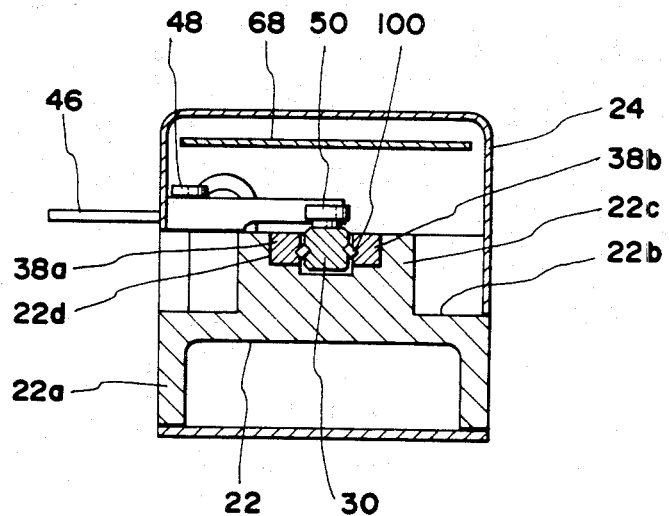
FIG. 3 is a vertical sectional view of the measuring machine of the present invention taken along line III—III of FIG. 1.

As is shown in FIGS. 2 and 3, the base 22 is formed with a rectangular upstanding portion 22a, a flat portion 22b integrally formed with the upstanding portion 22a, and a cuboid-shaped projection 22c. As is shown in FIGS. 1 and 2, the stationary measuring contact point 26 is fixed to a front portion of the base 22 by a bracket 60. The movable measuring contact point 28 is inserted into an end portion of the spindle 30 such that an end of the movable measuring contact point 28 is opposed to an end of the stationary measuring contact point 26. The movable measuring contact point 28 is fastened to the spindle 30 by a fastening screw 62. An end portion of the glass scale plate 32 is secured to the other end portion of the spindle 30.

Returning to FIG. 1, the read sensor 34 of the scaling member 14 is mounted on a fastening frame 40a which is secured to the casing 24. The light source 36 is secured on a fastening frame 40b which is also secured to the casing 24 so as to be opposed to the fastening frame 40a spaced therefrom.

Figure 4:
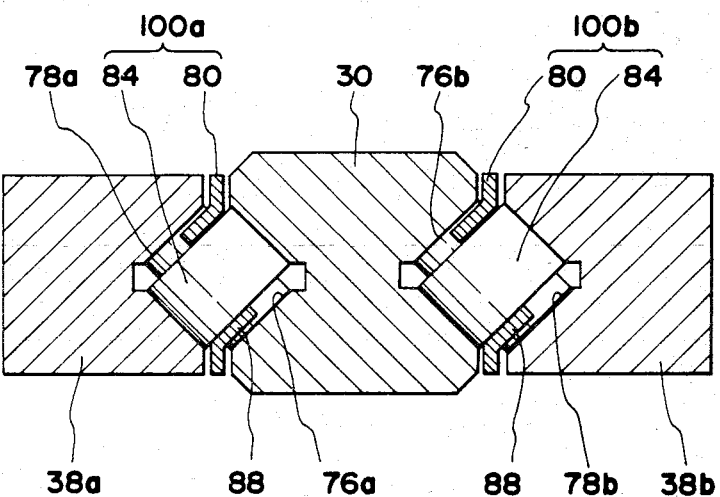
FIG. 4 is an enlarged sectional view of a main portion of FIG. 3.

As best shown in FIG. 4, the bearing units 100a and 100b of the guiding member 16 (FIG. 1) is positioned at both sides of the spindle 30. As is shown in FIG. 3 the bearing unit 100 (100a in FIG. 4) is located between the spindle 30 and the guiding bar 38a. The bearing unit 100 (100b in FIG. 4) is located between the spindle 30 and the guiding bar 38b. The guiding bars 38a and 38b are located between projections 22c. Returning to FIG. 1, the support plates 42a and 42b of the supporting member 18 are fastened to the casing 24 by way of the discplate 44.

A center portion of the activating lever 46 of the actuating member 20 is pivotably mounted on the casing 24 by means of the pin 48. A pair of actuating pins in the form of screws 50 and 52 is provided on the spindle 30 of the measuring member 12 spaced apart at a predetermined distance from each other. An end portion 46a of the actuating lever 46 contacts with the screws 50 or 52 by operating the actuating lever 46. A base portion of the actuating rod 56 is inserted into a plug 64 which is mounted on the casing 24. The actuating rod 56 is inserted into a compression coil spring 54 of which an end portion contacts a flange 56b of the actuating rod 56 and the other end portion contacts the plug 64. Accordingly, an end portion 56a of the actuating rod 56 is engaged with a recess 46b of the actuating lever 46. The spindle 30 is movably supported on the base 22 by the bearing units 100. The bearing units 100 are linear bearing devices of a crossed roller type which are covered by Japanese Pat. No. 1,102,253 which is granted to the present applicant.

As is best shown in FIG. 4, the bearing units 100a and 100b are arranged at both sides of the spindle 30. Both sides of the spindle 30 is provided with longitudinal slots 76a and 76b. The longitudinal slot 76a is provided on one side surface of the spindle 30 and the longitudinal slot 76b is provided on the other side surface of the spindle 30. The guiding bar 38a is provided with a longitudinal rectangular slot 78a which is provided on a longitudinal side surface. One longitudinal quadrangular slot is formed with the slot 76a of the spindle 30 and the slot 78a of the guiding bar 38a. The bearing unit 100a is arranged in the quadrangular slot. A longitudinal rectangular slot 76b is provided on the other side surface of the spindle 30. A longitudinal rectangular slot 78b is provided on the side surface of the guide bar 38b. Another longitudinal quadrangular slot is formed with the slots 76b and 78b, where the bearing unit 100b is arranged therein. The bearing units 100a and 100b include roller means 84 and a supporting frame 80.

Figure 5:
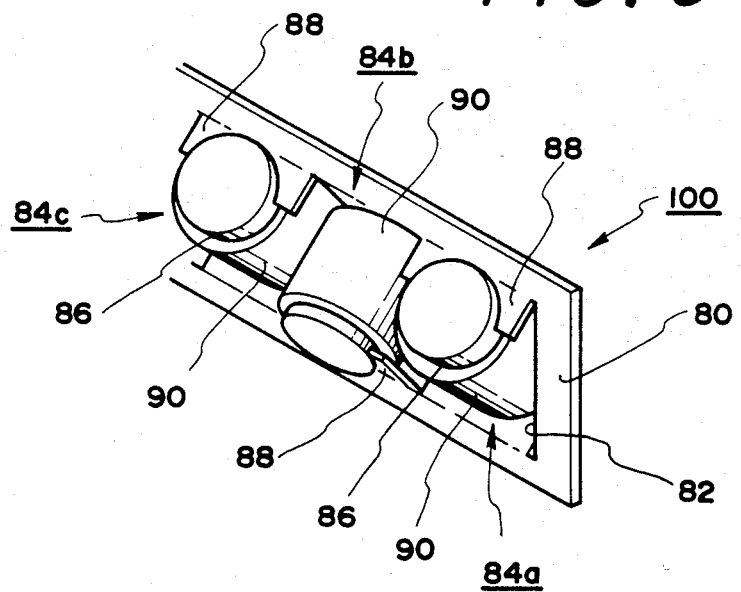
FIG. 5 is a perspective view of a bearing unit employed in a measuring machine of the present invention.

As is best shown in FIG. 5, each of the bearing units 100 (100a and 100b in FIG. 4) includes a supporting frame 80 having a quadrangular aperture 82 and roller means 84 including a plurality of tubular rollers 84a, 84b and 84c. The number of the roller means 84 (FIG. 4) can be altered as required. Each of the rollers is positioned so as to be orthogonally directed with respect to other adjacent rollers.

As shown in more detail in FIGS. 4 and 5, a pair of supporting brackets 88 are provided at the supporting frame 80 of which one bracket 88 is opposed to the other. A plurality of pairs of the supporting brackets 88 is arranged on the supporting frame 80 spaced apart at a predetermined distance. As shown in FIG. 5, each cylindrical shaft 86 is supported by a corresponding supporting bracket 88. Each tubular roll 90 is rotatably mounted on the supporting bracket 88 and is formed integrally with shaft 86.

As described above in reference to FIG. 1, the stationary measuring contact point 26 is mounted on the base 22 of the housing 10. The movable measuring contact point 28 is secured to the end portion of the spindle 30 so as to oppose the stationary measuring contact point 26 in an axial line. The spindle 30 is supported and positioned between the pair of guiding bars 38a and 38b which are carried on the base 22 by the bearing units 100 (100a and 100b in FIG. 4). Measuring of the object to be measured can be performed by putting the object between the stationary measuring contact point 26 and the movable measuring contact point 28. The glass scale plate 32 is fastened to the rear portion of the spindle 30. The read sensor 34 is positioned to be opposed to one side of the glass scale plate 32. The measured value is read by the read sensor 34 in accordance with the moving value of the glass scale plate 32. The measured value is converted to an electrical value and thereafter is displayed by a digital display 70.

The end portion 46a of the actuating lever 46 is located between the forwardly pressed screw 50 and the backwardly pressed screw 52. The end portion 56a of the actuating rod 56 is contacted by the actuating lever 46 due to the reaction force of the coil spring 54. Accordingly, the end portion of the movable measuring contact point 28 usually contacts the stationary measuring contact point 26.

When the actuating lever 46 is rotated in the counterclockwise direction as is shown by an arrow γ in FIG. 1, the movable measuring contact point 28 is moved in the longitudinal and backward direction together with the spindle 30 so that the object to be measured may be put between the contact points 26 and 28.

According to the present invention, a spindle 30 supporting a movable measuring contact point 28 is supported by a linear bearing unit 100 of the crossed roller type and is restricted by the linear bearing unit 100. The rectlinear propagating motion of the contact point 28 is stabilized without any generation of vibration against the upper and lower direction force and the rotating force. Further, the friction resistance acting on the spindle 30 is small in spite of the fact that the compressing force is applied to the bearing unit 100. The smooth motion of the contact point 28 can be performed and thereby the force for moving the spindle 30 is decreased. Moreover, the vibration of the spindle 30 is prevented since the gap or clearance in the bearing unit 100 is completely eliminated. Therefore, the error of the measuring precision is eliminated and the endurance of the measuring machine is enhanced.

In view of the above, it will be seen that the objects of the invention are achieved and other advantageous results are attained.

While a preferred embodiment of the invention has been shown and described, it will be apparent to those skilled in the art that modifications can be made within the scope of the invention which is defined in the appended claims. Accordingly, the foregoing embodiment is to be considered illustrative only, rather than restricting the invention and those modifications which come within the meaning and range of the equivalency of the claims are to be included herein.

What is claimed is:

1. A measuring machine, comprising:

a housing provided with a base and a casing mounted on the base;

means, secured to the base, for measuring a dimension of an object, said measuring means having a stationary measuring contact point, a movable measuring contact point, a slidable spindle means for carrying the movable measuring contact point into contact with the stationary measuring contact point, said slidable spindle means having longitudinal rectangular slots in opposite sides thereof;

sensor means, attached to one end of the slidable spindle means, for reading the dimension obtained by the measuring means;

means, attached to the base, for guiding movement of the slidable spindle means, said guiding means including bars arranged on the opposite sides of the slidable spindle means, said bars having longitudinal rectangular slots in opposite sides thereof;

actuator means, mounted on the casing, for moving the slidable spindle means;

at least a pair of linear bearings, positioned between the slots in the opposite sides of the slideable spindle means and the slots in the sides of the bars of the guiding means, each of said pair of linear bearings including a supporting frame having a plurality of supporting brackets, a plurality of tubular rollers having cylindrical shafts, each of the plurality of tubular rollers being rotatably supported by one of the plurality of supporting brackets and having its longitudinal axis perpendicular to but spaced equidistant from longitudinal axes of adjacent ones of the plurality of tubular rollers.

* * * * *